Nov. 20, 1934.  F. H. BENGE  1,981,771
COMPOSITE ARTICLE AND METHOD OF MAKING THE SAME
Filed Aug. 9, 1932   2 Sheets-Sheet 1
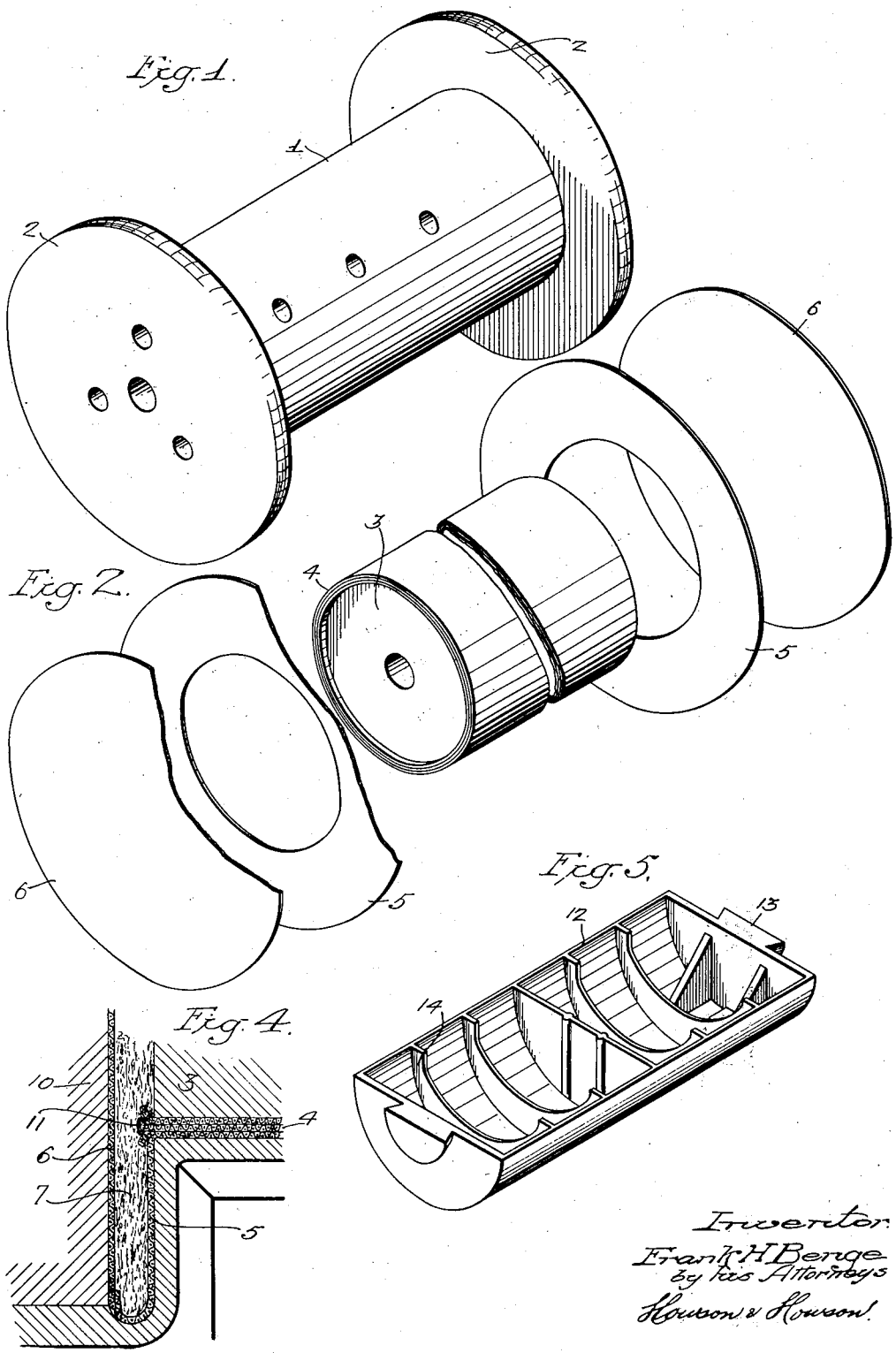

Nov. 20, 1934. F. H. BENGE 1,981,771
COMPOSITE ARTICLE AND METHOD OF MAKING THE SAME
Filed Aug. 9, 1932 2 Sheets-Sheet 2
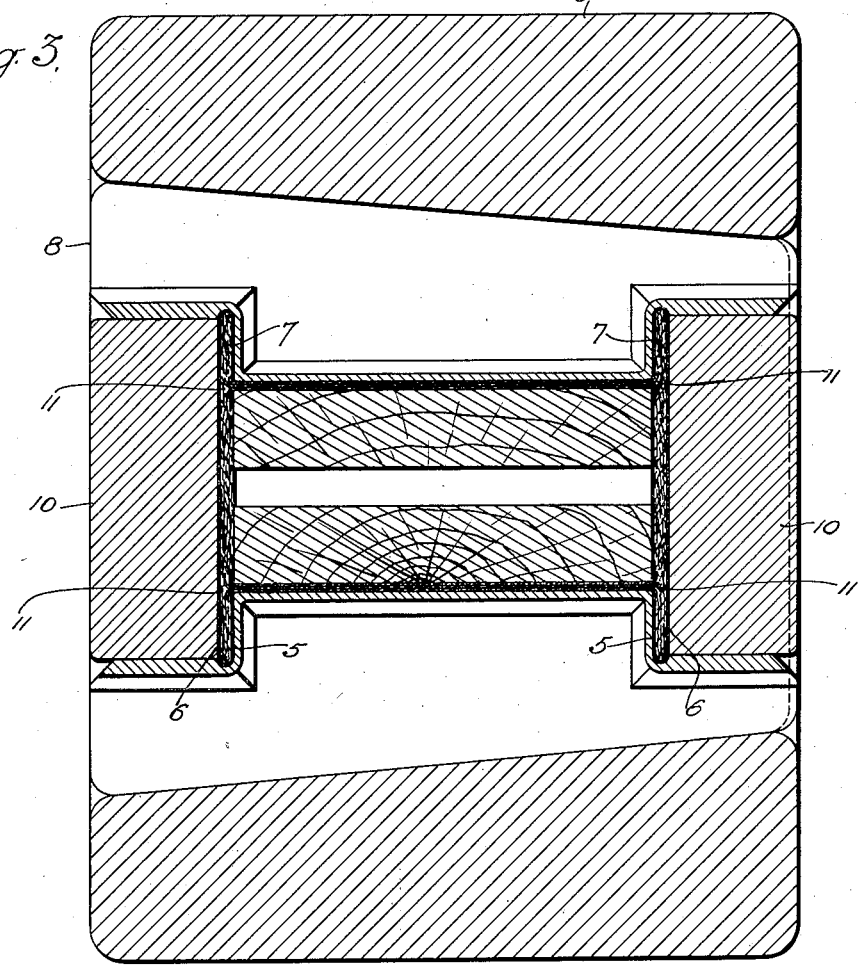
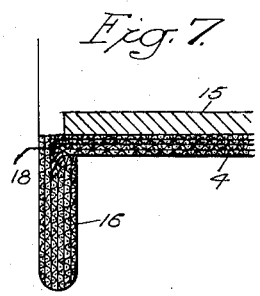
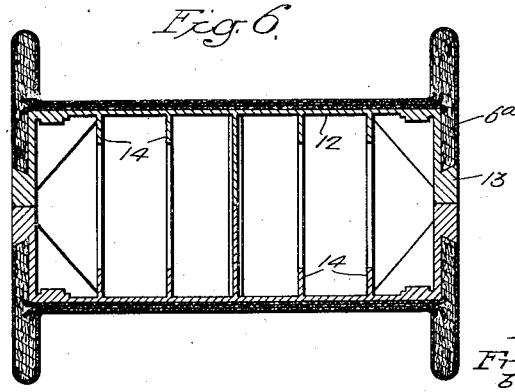
Inventor
Frank H Benge
By his Attorneys
Howson & Howson Patented Nov. 20, 1934

1,981,771

UNITED STATES PATENT OFFICE 1,981,771

COMPOSITE ARTICLE AND METHOD OF MAKING THE SAME

Frank H. Benge, Norristown, Pa., assignor to Continental-Diamond Fibre Company, Newark, Del., a corporation of Delaware Application August 9, 1932, Serial No. 628,106

5 Claims. (Cl. 18—59)

This invention relates to composite articles and to methods of making such articles. While it is general in its application, the invention is particularly applicable to the construction and manufacture of bobbin spools, for example, those used in the silk manufacturing industry. Such spools comprise a cylindrical body and a flanged head at each end thereof. Although I have chosen, for the purpose of disclosure, to illustrate the invention herein in connection with bobbin spools, it is to be understood that it is in no way limited to such articles and is capable of practice in connection with any article having a body and an enlarged head or other portion attached to the body.

An object of the invention is to provide an improved unitary composite article which is so constructed as to impart to it a desired high degree of mechanical strength and durability and lend itself readily to economic manufacture.

Another object of my invention is to furnish a composite article having a body portion and an enlarged head or other flanged portion securely attached thereto and integrally united therewith.

A further object of the invention is to provide a novel and simple method of making composite articles of the class designated and with the properties described.

In accordance with the invention, the constituent parts of the composite article are formed of fibrous material having associated therewith a suitable binder. The body of the article is formed by rolling or wrapping fibrous sheet material about a suitable core or mandrel. The flanged head or other enlarged portion of the article is formed by superposing layers of fibrous material having associated therewith a like binder, and the head is placed upon an end of the wrapped sheet material of the body in such manner that the end of the wrapped material extends into the head. The composite parts are then molded, which operation causes the end of the wrapped sheet material to spread and securely lock the head to the body. The core or mandrel employed may be removed after the molding operation or it may remain as an integral part of the structure.

While any suitable fibrous material and any suitable binder may be used, I prefer to use paper or cloth sheets impregnated with synthetic resin preferably of the phenolic type, such as a phenol-formaldehyde resin. As is well known, these resins exist in either of two stages, viz., an initial or fusible stage, or a final or insoluble and infusible stage. In its initial stage, the resin constitutes an inactive binder or adhesive. When converted from its soluble to its insoluble stage, by a process involving heat with or without pressure, the resin constitutes an active binder serving to hold or secure together in the form of a unitary article the fibrous materials with which it is associated.

The construction of the improved article, as well as the novel method of making the same, may be clearly understood from the following detailed description and the accompanying drawings.

In the drawings:

Figure 1 is a perspective view of a bobbin spool of the class above mentioned, the invention being illustrated herein in connection with such spools as stated above;

Figure 2 is an exploded perspective view, showing clearly the essential constituent parts of a spool manufactured in accordance with the invention;

Figure 3 is a sectional view through a mold, showing the constituent parts of the composite article in place therein and illustrating clearly the method of manufacture;

Figure 4 is an enlarged detail illustration of the interlocking feature of the invention;

Figure 5 is a perspective view of one of the separable halves of a modified form of core which may be used in making the article;

Figure 6 is a sectional view through the modified form of composite article, using the core illustrated in Figure 5; and Figure 7 is a detail partial sectional view of a further modification of the invention.

Referring to the drawings, there is illustrated in Figure 1 a bobbin spool commonly used for the purpose mentioned above, which spool, in accordance with the present invention, is formed essentially of resin-impregnated fibrous material and a core. It takes the customary form comprising a round or cylindrical body 1 and flanged heads 2 attached to the ends thereof.

In practicing the present invention, the body 1 is first formed by wrapping fibrous sheet material about a core. The fibrous sheet material is preferably impregnated with synthetic resin in its fusible stage, as stated above. As illustrated in Figures 2 and 3, the core 3 takes the form of a cylindrical block of wood, 4 designating the sheet material wrapped about the core. The length of the core is preferably made slightly less than the width of the sheet material which is wrapped about it, the purpose of this being clearly set forth hereinafter. As a result of the relative dimensions of these elements, the ends of the wrapped sheet material protrude or extend beyond the ends of the core, as illustrated in Figures 2 and 3.

The flanged heads of the spool are formed of several layers of fibrous material also impregnated with synthetic resin in its fusible stage. Preferably, the heads are each built up of layers of sheet and macerated or scrap material cut to suitable size. These layers may alternate but this is not necessary. In the preferred form, as illustrated in Figures 2 and 3, the heads of the spool each comprises a fibrous ring 5, a fibrous plate 6 spaced therefrom, and macerated or scrap material 7 (see Figure 3) interposed between these elements and filling the extension beyond the end of the core formed by the wound fibrous sheet material. The opening in ring 5 is of such dimension that this element exactly fits over the end of the wrapped sheet material of the body as shown in Figure 3.

In making the spool, the preformed body together with the constituent elements of the flanged heads are placed together in a suitable mold 8, as shown in Figure 3. The heads are associated with the body in the manner described above and, as a result, the extending ends of the wrapped sheet material of the body extend into the heads. While the mold is illustrated herein as being of the tapered type, comprising two tapered halves and a ring 9, into which the halves of the mold are forced, it will be understood that any suitable mold may be used. In the particular form of mold illustrated, a pair of end plates 10 may be used to obtain the desired pressure on the outer face or surface of the heads.

After the constituent parts of the article have been placed in a suitable mold, as illustrated, sufficient heat and pressure are applied to compact and unify the article and to convert the heat-convertible resin, if it is employed, to the final infusible stage. In a typical case using a phenol-formaldehyde resin as a binder, the assembled bobbin spool is heated in the mold for approximately twenty minutes at a temperature corresponding to one hundred twenty-five pounds of steam and at a pressure of approximately two thousand pounds per square inch. This steam pressure results in a temperature in the neighborhood of 275° F. in the material. The molding operation causes the protruding ends of the wrapped sheet material of the body to spread, as illustrated more clearly in Figure 4 at 11, thus securely locking the heads to the body. It will be obvious that the spreading of the ends causes the fibres of the sheet material to intermesh and interlock with the fibrous scrap or macerated material and the fibre sheets forming the heads. This is a very important feature of the invention since it results in a very strong, unitary article. It is especially important in the cases of articles such as that illustrated, which articles during their normal use are subjected to great mechanical strain.

While the use of macerated or scrap material is not necessary and the flanged heads or enlarged portions may be made entirely of superposed rings and plates, the use of the scrap material lessens the cost of the article materially without detrimentally affecting its efficiency or lessening its mechanical strength. When the heads are constructed as specifically described above, the spaced outer sheets become firmly locked together along their edges during the molding operation and present a desirable appearance to the finished product, concealing entirely the scrap material. The scrap material, in addition to lessening the cost of the article, also serves the useful function mentioned above in connection with the spreading ends of the wrapped sheet material of the body. The fibrous pieces making up the scrap readily interlock with the spreading ends to effect the desired locking of the elements.

In Figures 5 and 6 of the drawings, there is illustrated an alternative embodiment of the invention which differs only from the preferred embodiment described above in the specific construction of the core used in making the article. This core comprises two similar halves, one of which is illustrated in Figure 5 for the sake of clarity. The halves are formed from light metal, such for example as aluminum. Each comprises a hollow semi-cylindrical portion 12 having outwardly tapered interlocking heads 13 integral with the ends thereof. The purpose of these heads will be apparent hereinafter. The core is preferably strengthened and rigidified by the provision of internal ribs 14, which are formed integrally with the cylindrical body of the core. These ribs also serve the useful purpose of enabling variations in the weight of the core to satisfy varying requirements. In other words, by varying the size and shape of the various ribs, the total weight of the core may be varied at will.

In this alternative embodiment of the invention, the article is formed in substantially the same manner as described above. In this case, however, the outer plate 6a of each head takes the form of a ring through the central opening of which the interlocking head of the core extends. Furthermore, as shown clearly in Figure 6, the macerated or scrap material is placed about the interlocking heads of the core. The purpose of these heads will now be apparent since their tapered construction causes them to firmly interlock with the heads of the article. Thus, the locking action of the spreading ends of the wrapped fibrous material of the body is augmented by the additional locking action of the interlocking heads of the core. Aside from these differences, the construction and method of making the article are identically the same as described above in connection with the preferred embodiment. When the alternative form of article is completed, the core halves will, of course, constitute a unitary whole within the fibrous composite article. The necessary holes in the finished spool may be readily drilled through the fibrous material and the hollow metallic core.

In Figure 7 there is illustrated a further modified form of the article in which the core or mandrel takes the form of an aluminum sleeve or bushing 15 about which the resin-impregnated fibrous sheet material 4 forming the body is wrapped. In this instance, the heads are preferably formed of superposed rings 16 of resin-impregnated fibrous material. The width of the wound sheet material 4 is in this case also greater than the overall length of the bushing so that the barrel of the spool is long enough to project beyond the bushing or sleeve into the head formed of the superposed rings. In a typical case six rings superposed are employed, four of which are provided with an opening of sufficient diameter to permit them to be pushed well over the ends of the wrapped material and bushing so that these ends extend into the head. The two remaining rings have openings therein of less diameter so that they do not slip over the body portion, but rest upon the wound laminations. The article is formed in substantially the same manner as described above in connection with the previous embodiments, and the molding operation causes the ends of the wrapped material 4 to spread as at 18 so that an interlocking of the body and heads is obtained. After the bobbin spool is removed from the mold, the ends of the aluminum sleeve or bushing are preferably flared or tapered (not shown) in order to insure the elimination of burrs. Although only one portion of one end of the article is dislosed in Figure 7, it will be understood that the same construction is employed throughout.

While it is oftentimes preferable that the metallic sleeve or bushing shall be retained as an integral part of the article, it may be removed after completion of the article if desired. In other words, the bushing may be used merely as a mandrel upon which to wind the material forming the body and which cooperates with the body and heads during the molding operation, but is later removed. In the case where the mandrel is removed, it is usually necessary to employ a barrel of greater wall thickness of wound resin-impregnated sheets than otherwise, in order to impart sufficient rigidity to the article.

The bobbin spools of the present invention are a marked improvement over those previously employed where resin-impregnated fibrous heads have been screwed on wooden shanks. In the use of the old style spools, the threads catch in the small space between the head and shank. In the spools of the present invention, a unitary article is provided in which there can be no damaging of the threads. In the use of the bobbin spools in the silk industry particularly, it is highly desirable that as little swelling of the spool shall occur in water as possible, since the spools with the threads wound thereon are subjected to a steaming process, after which the threads are dried on the spools. In the old style spools, an expansion of ⅛ inch occurs when the spools are immersed in water for six days at 195° F. Under the same treament, the spools of the present invention containing the wooden core swell only .015 inch while no swelling whatsoever occurs with spools containing the metal core. Thus it will be seen that the bobbin spools constructed in accordance with the present invention are particularly applicable in industries where a steaming process is employed.

It will be apparent from the disclosure of the invention and the above description, that the article contemplated by the invention has highly desirable characteristics, among which are its mechanical strength and durability as previously pointed out. It will also be obvious that the method of making the article is simple and may be readily carried out at low cost. While the invention has been illustrated herein in connection with a specific construction of bobbin spool, it will be understood that various changes in the details of construction may be made and that the invention may be practiced in any instance where it is adapted to the particular article being constructed. Only such limitations, therefore, as are embodied in the appended claims are to limit the invention.

I claim:

1. A method of making a composite article having a body and a flanged head, which comprises preforming the body of rolled fibrous sheet material having a binder associated therewith, forming the flanged head from layers of fibrous material and an associated binder in cooperative relation with an end of said body so that the end of the body extends into and remains within the head, molding the body and head together to form the composite article, and during said molding exerting pressure on the head so as to spread the end of the rolled sheet material within the head and securely lock the head to the body.

2. A method of making a composite article having a body and a flanged head, which comprises preforming the body of rolled fibrous sheet material having a binder associated therewith, forming the flanged head from spaced binder-treated fibrous sheets and an intermediate filling of small binder-treated fibrous pieces in cooperative relation with an end of said body so that the end of the body extends through one of said sheets into said fillings, molding the body and head together to form the composite article, and during said molding exerting pressure on the head so as to spread the end of the rolled sheet material within the head and cause intermeshing and interlocking of the fibres of the head and the body.

3. A composite article having a body and a flanged head, said body comprising rolled fibrous sheet material associated with a binder, said head comprising compressed superposed layers of fibrous material and an associated binder, and end of the sheet material of the body extending into said head and terminating within the head in an embedded annular flared edge so as to provide a localized annular interlocking joint between the body and the head, the compressed material of the head maintaining the embedded flared edge in interlocking position.

4. A composite article having a body and a flanged head, said body comprising a core and fibrous sheet material associated with a binder surrounding the core, said head comprising spaced binder-treated fibrous sheets and an intermediate filling of small binder-treated fibrous pieces abutting an end of said core, an end of the sheet material of the body extending beyond the core into said filling and terminating therein in an embedded annular flared edge so as to provide a localized annular interlocking joint between the body and the head, the compressed material of the head maintaining the embedded flared edge in interlocking position.

5. A composite article having a body and a flanged head, said body comprising a core with an interlocking head and fibrous sheet material associated with a binder surrounding the core, said flanged head comprising compressed superposed layers of fibrous material and an associated binder abutting an end of said core and embedding the interlocking head thereof, an end of the sheet material of the body extending beyond the core body into said head and terminating within the head in an embedded annular flared edge so as to provide a localized annular interlocking joint between the body and the head, the compressed material of the head maintaining the embedded flared edge in interlocking position.

FRANK H. BENGE.